United States Patent
Griffith

[15] 3,678,285
[45] July 18, 1972

[54] LOAD ANTICIPATION CONTROL FOR A FREE TURBINE TYPE OF POWER PLANT

[72] Inventor: James J. Griffith, East Granby, Conn.
[73] Assignee: United Aircraft Corporation, E. Hartford, Conn.
[22] Filed: Sept. 23, 1970
[21] Appl. No.: 74,726

[52] U.S. Cl. .................................290/40, 290/52, 415/36, 60/39.22, 60/39.16, 417/409
[51] Int. Cl. ................................................H02p 9/04
[58] Field of Search.........................290/40, 43, 52, 54, 44; 417/409; 60/39.24, 16, .22; 415/36

[56] References Cited

UNITED STATES PATENTS

| 2,939,017 | 5/1960 | Teague et al. | 290/52 |
| 2,917,636 | 12/1959 | Akeley et al. | 290/52 |
| 2,917,637 | 12/1959 | Akeley | 290/52 |
| 2,953,691 | 9/1960 | Rapp | 290/90 X |
| 3,045,426 | 7/1962 | Brahm | 290/40 |
| 3,517,208 | 6/1970 | Williams et al. | 290/52 X |

Primary Examiner—G. R. Simmons
Attorney—Norman Friedland

[57] ABSTRACT

The inlet guide vanes that adjust the pneumatic load of a compressor driven by the free turbine of a free turbine type power plant are positioned as a linear function of electrical load and inlet pressure.

7 Claims, 1 Drawing Figure

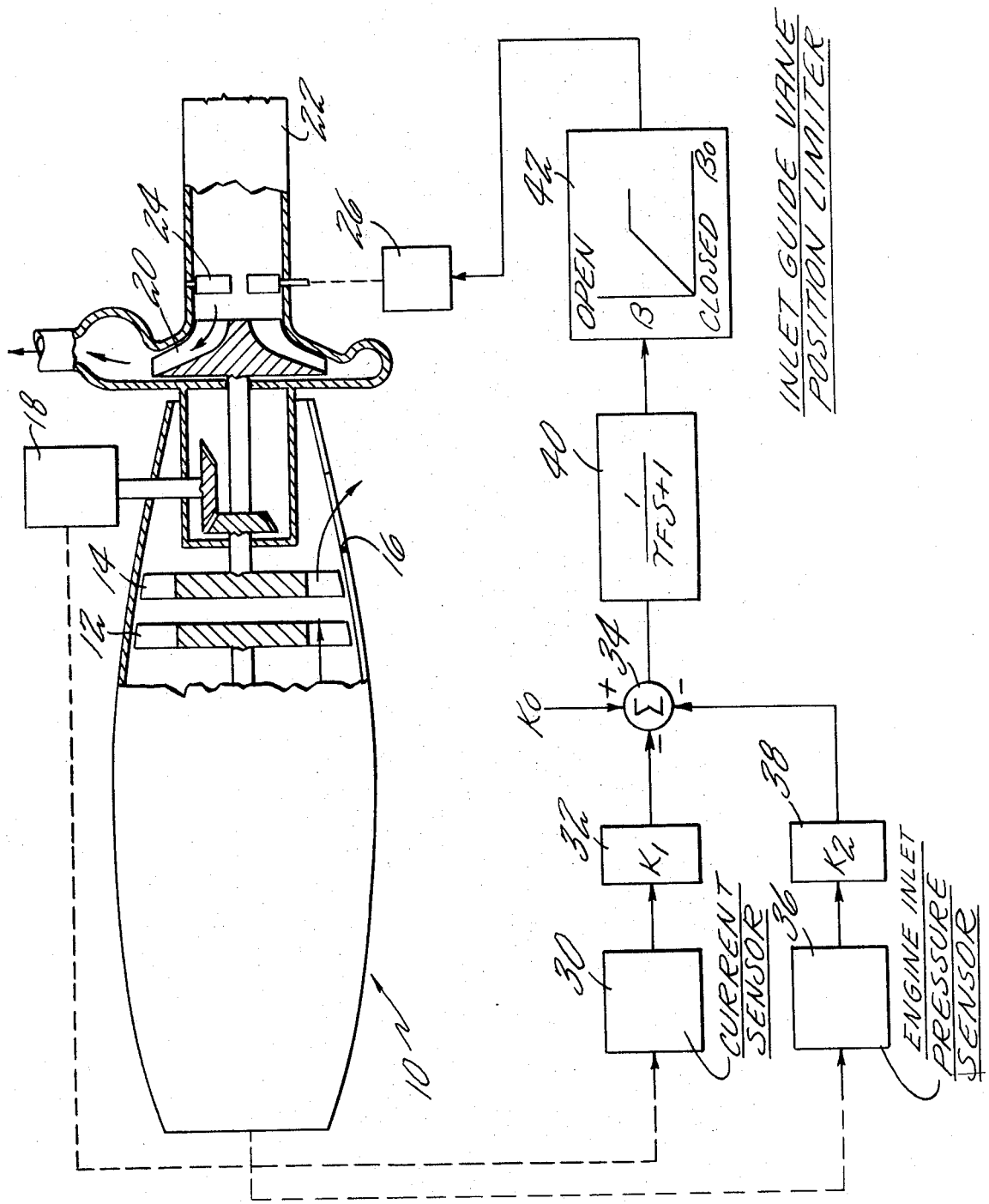

LOAD ANTICIPATION CONTROL FOR A FREE TURBINE TYPE OF POWER PLANT

BACKGROUND OF THE INVENTION

This invention relates to an auxiliary power unit (APU) for aircraft which includes a free turbine engine driving an electrical generator and a load compressor which load compressor includes inlet guide vanes for admitting fluid thereto and more particularly to a control which schedules the inlet guide vanes as a linear function of electric load and inlet pressure.

In aircraft application it is imperative that the electrical generator speed must at all times remain within 5 percent above or below its specified speed requirement operating over the entire operating regime. In a two-shaft engine it is well known that the rate of response of the engine decreases with a decreasing inlet pressure. This results in an intolerable condition since the free turbine APU may meet speed specification for a given step in electrical load at sea level but fails to meet this specification at altitude condition. Although there have been attempts to solve this problem, such attempts have been rather complex and results difficult to obtain since the relationship between response and inlet pressure are nonlinear in nature and heretofore known controls provided to solve this problem utilized nonlinear schedules. I have found that I can solve the problem in a more simplified and economical manner by rapidly unloading the pneumatic power in response to large electrical increased step changes so that the free turbine is only aware of a fraction of the applied electrical step or conversely, pneumatically loading the load compressor in response to a large decreasing electrical step. This has the effect of aiding the fuel control in reducing power unbalance on the free turbine quickly enough to avoid excessive speed error. This concept affords the following advantages:

1. Simplicity, since no function generators or multipliers are necessary;
2. A wide range of specifications can be met simply by adjusting the gain of the scheduling function eliminating the necessity of changing the actuator design; and
3. Such a system is flexible inasmuch as it can be trimmed to meet the hardware tolerances by merely adjusting the amplifier gains.

SUMMARY OF INVENTION

It is an object of this invention to provide for an APU driven by a free turbine type of power plant means for scheduling the inlet guide vane positions as a function of the electrical load changes and the inlet pressure of the power plant.

A still further object of this invention is to schedule the inlet guide vanes of the load compressor for an APU consisting of a turbine type of free turbine power plant driving an alternator which schedule is a linear function of electrical load and engine inlet pressure.

A still further object of this invention is to provide in a control as described means for scheduling the inlet guide vanes of the load compressor which control is characterized as being simple and economical to manufacture as well as being flexible insofar as being capable of being utilized for a wide variety of operating requirements.

Other features and advantages will be apparent from the specification and claims and from the accompanying drawing which illustrates an embodiment of the invention.

BRIEF DESCRIPTION OF THE DRAWING

The sole FIGURE is a schematic illustration partly in section of the preferred embodiment of this invention.

DESCRIPTION OF THE PREFERRED EMBODIMENT

Reference is now made to the sole FIGURE which illustrates an APU as consisting of a free turbine type of power plant illustrated by reference numeral 10. A suitable free turbine type of power plant is the PT-6, manufactured by United Aircraft of Canada Limited. Obviously, as is typical in a free turbine type of power plant, the energy extracted from gas discharging from the power generator turbine 12 driving the gas generator, drives free turbine 14 and the exhaust gas is discharged through the outlet 16. Free turbine 14 is only connected to the engine by virtue of the gas connection there being no mechanical connections between the first and second shafts of the engine. Free turbine 14 is utilized to drive various auxiliary power devices such as the alternator, air compressor and the like in the aircraft. The load compressor 20 driven by the free turbine receives air through inlet 22 and is directed thereto through inlet guide vanes 24. The area of the inlet guide vanes is adjusted by virtue of the actuator schematically illustrated at 26. Thus, rotating the vanes 24 serves to increase and decrease the flow area so as to regulate the flow of air into the load compressor 20, hence controlling the load on the compressor. The alternator 18, which generates electricity in the aircraft, is designed such that its speed must be maintained at a constant value and within very close tolerances. Thus, it is imperative for the control to assure that the free turbine operates within a predescribed speed range.

Due to inertia, the tendency of the free turbine is to lag in response to the changes in the gas generator since the only connection is the gaseous one between turbine 12 and 14. Thus, any large changes in load would result in a lag between the power response and the free turbine response creating a speed rise or drop that would be above or below the predescribed range for driving the alternator 18.

In accordance with this invention a suitable current sensor 30 sensing the current in the alternator 18 produces a signal proportional to current and transmits it through box 32 where it is multiplied by a constant $K_1$. A suitable current sensor may be of the type manufactured by American Aerospace Controls, Inc. such as model number 909. This signal is passed to the summation box 34 where it is biased by a reference signal $K_0$. The signal is also biased by an inlet pressure signal sensed by a suitable inlet pressure sensor 36, also multiplied by a constant $K_2$ in box 38. A suitable inlet pressure sensor may be of the type manufactured by Computor Instrument Corporation as reported in its Catalogue No. PTS 1164 of pressure transducers. The signal is then transmitted through filter 40 or time lag through limiter 42 for driving actuator 26 which, in turn, positions vanes 24 for loading and unloading compressor 20. The circuitry comprising box 40 may be a well known time lag circuit as for example the circuit disclosed on Page 46 of the Philbrick Research, Inc., book entitled "Applications Manual for Computing Amplifiers," 2nd Edition June 1966. Thus, for a large electrical increase in load of generator 18, current sensor 30 sensing the large change in electrical load transmits a signal to the actuator 26 calling for the actuator to move the guide vanes toward the closed position for reducing the amount of air admitted to the load compressor 20. Obviously, this tends to unload the free turbine 14 hence, aiding the fuel control for adjusting to the load change and reducing power unbalance on the free turbine quickly enough to avoid excessive speed error. Obviously, the converse is true when the electrical load drops. As sensed by the current sensor 30, the vanes are then moved to an open position for loading the load compressor 20. Thus, it is apparent that the guide vanes pneumatically change the load on compressor 20 which, in turn, loads and unloads the free turbine 14 to compensate for load changes in the electrical load. Since the response time is different for different altitudes, biasing the electrical load change by inlet pressure sensor 36 serves to keep the speed tolerance within its required value for all altitude conditions. The inlet pressure sensor 36 senses the pressure at the inlet of the engine and transduces this pressure signal to an electrical signal which is indicative of inlet pressure.

It should be understood that the invention is not limited to the particular embodiments shown and described herein, but that various changes and modifications may be made without departing from the spirit or scope of this novel concept as defined by the following claims.

I claim:

1. For an aircraft having an auxiliary power unit driven by the free turbine of a free turbine type of power plant driving an electrical alternator normally operating at a constant speed, and also driving a load compressor having inlet guide vanes for controlling the air flow to said load compressor, means for adjusting the area of said guide vanes and control means responsive to changes in electrical loads on said electrical alternator and the inlet pressure of said free turbine type of power plant for controlling said adjusting means.

2. For an aircraft a control system as claimed in claim 1, wherein said control means responsive to said changes in electrical load and the inlet pressure produces a linear signal as a compromise signal to the nonlinear relationship of the response time of said control for different altitudes.

3. For an aircraft having an auxiliary power unit a free turbine driven by a free turbine type of power plant, an electrical alternator driven by said free turbine normally operating at a constant speed, a load compressor also driven by said free turbine and having inlet guide vanes for controlling the air flow to said load compressor, actuator means for adjusting the area of said guide vanes to change the load on said load compressor, control means responsive to step changes in electrical loads on said electrical alternator for controlling said adjusting means, and means responsive to the inlet pressure of said power plant biasing said control means.

4. For an aircraft having an auxiliary power unit driven by the free turbine of a free turbine type of power plant controlled by an independent control having an electrical alternator normally operating at a constant speed, a load compressor having inlet guide vanes for controlling the air flow to said load compressor, actuator means for adjusting the area of said guide vanes and control means including an electrical current sensor responsive to changes in electrical loads on said electrical alternator for controlling said adjusting means, and transducer means responsive to the inlet pressure of said power plant for electronically biasing said current sensor signal for controlling said adjusting means.

5. For an aircraft as claimed in claim 4 including filtering means for filtering out the combined electrical load and inlet pressure signal.

6. For an aircraft as claimed in claim 5 including a limiter for preventing said combined electrical load and inlet pressure signal from going beyond a predetermined value.

7. An auxiliary power unit driven by the free turbine of a free turbine type of power plant, an electrical alternator driven by said free turbine so as to operate at a constant speed a load compressor also driven by the free turbine and having inlet guide vanes for controlling the air flow to said load compressor, actuator means for adjusting the area of said guide vanes and means responsive to step changes in electrical loads on said electrical alternator for producing a first signal, means responsive to the inlet pressure of said power plant for producing a second signal and means for combining said first signal and said second signal for controlling said actuating means.

* * * * *